July 24, 1956 P. V. BROWN 2,755,658
IMPACT TESTING MACHINE
Filed July 9, 1954 5 Sheets-Sheet 3

Inventor
Paul V. Brown
By John L. Hutchinson
Attorney

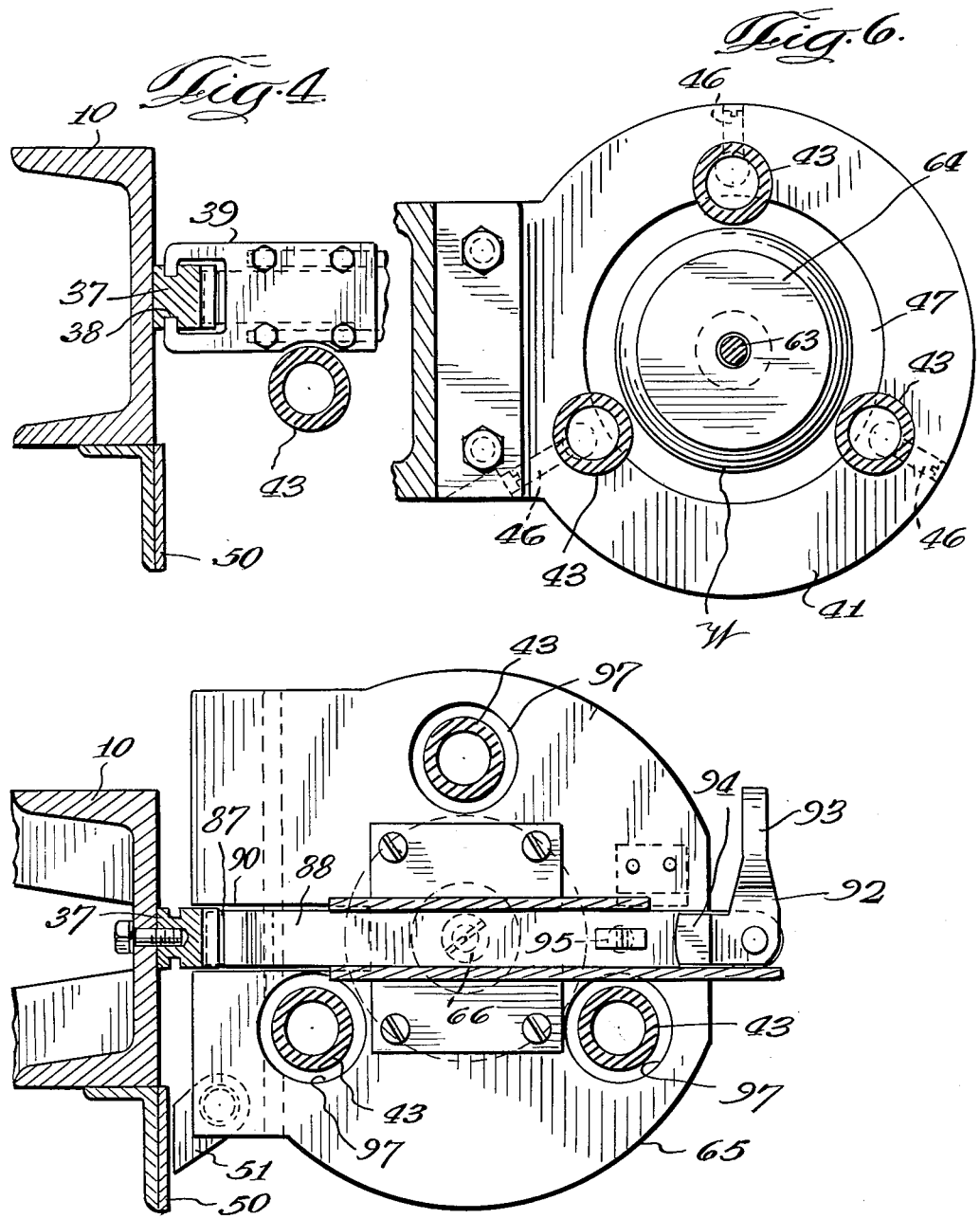

July 24, 1956  P. V. BROWN  2,755,658
IMPACT TESTING MACHINE

Filed July 9, 1954  5 Sheets-Sheet 5

Inventor
Paul V. Browne
By John L. Hutchinson
attorney

United States Patent Office 2,755,658
Patented July 24, 1956

2,755,658
IMPACT TESTING MACHINE

Paul V. Brown, Bellwood, Ill., assignor to The Richardson Company, Melrose Park, Ill., a corporation of Ohio Application July 9, 1954, Serial No. 442,259

21 Claims. (Cl. 73—12)

This invention relates to an impact testing machine of the type which may be used for testing the shock resistance of articles such as battery containers molded from plastic compositions. More particularly, the invention relates to an impact testing machine of the foregoing type which employs a freely falling weight to provide an impact on articles.

Molded articles are at present being made from numerous plastic materials having varied shapes and forms. As a specific example, reference can be made to the aforementioned battery containers which form the housing for automobile storage batteries. These containers are usually molded from a composition consisting of a plastic binder and a filler, including fibrous and non-fibrous fillers. As a result of the rough handling of such containers it is necessary that the containers be so constructed that they can withstand the normally expected impact or shock to which they may be subjected, without cracking.

To insure that molded articles of this type meet predetermined requirements as to impact resistance, representative containers from given lots are subjected to an impact test. A common means of testing impact resistance of products of the foregoing type is to subject them to the impact of a freely falling weight from various heights and observe the effect of the impact.

Accordingly, it is among the objects of this invention to provide an efficient and reliable mechanism for rapidly testing the impact resistance of an article with a freely falling weight.

Another object is the provision of an impact testing machine which enables the accurate reproduction of impact testing procedures.

Another object is the provision of an impact testing apparatus wherein the mechanism employed for releasably holding the weight may be elevated through a plurality of vertical increments which can be predetermined and automatically attained.

Another object is the provision of an impact testing apparatus which confines but does not contact or resist the freely falling weight during its downward travel and which provides means for using freely falling weights of varying sizes and weights.

A further object is to provide a testing machine of the foregoing type which permits impact tests on articles without application of external strain on the articles while under test.

A still further object is the provision of an impact testing apparatus which permits equivalent tests to be performed on articles of varying sizes and shapes.

These and other objects will become more apparent by reference to the following specification and accompanying drawing wherein:

Figure 4 is an enlarged horizontal section taken along line 4—4 of Figure 1.

Figure 5 represents an enlarged horizontal section taken along line 5—5 of Figure 1.

Figure 6 is an enlarged horizontal section on line 6—6 of Figure 1.

Figure 8 is a horizontal section taken along line 8—8 of Figure 2.

Description of the general assembly

Figure 1:
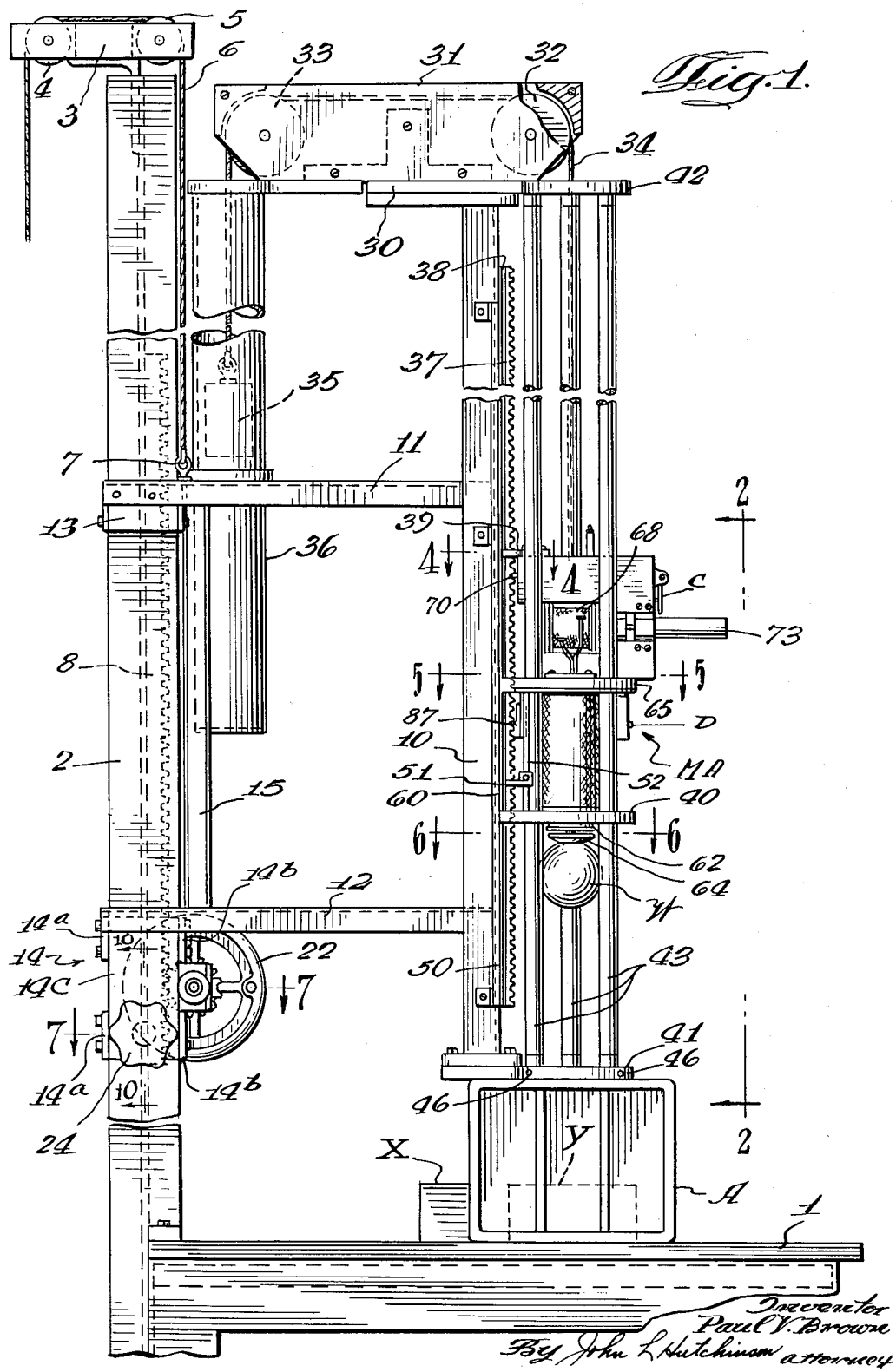
Figure 1 is a side elevation of the impact testing machine of this invention.

Referring more specifically to the drawings and particularly to Figure 1, the numeral 1 designates a table adapted to support an article undergoing test, as for example, a molded three compartment battery container A. Suitably connected to table 1 is a vertically extending stationary frame member 2, which in the illustrated embodiment of the invention, comprises an "I" beam. At the top of frame member 2 there is secured a horizontal bracket 3, which is provided with two pulleys, 4 and 5. A cable 6 is adapted to ride over pulleys 4 and 5. One end of the cable is connected at 7 to a second vertically adjustable frame, described hereinafter, while the other end of the cable is connected to a counterbalancing weight, not shown. Attached to the front part of the "I" beam or frame member 2 is a rack 8, additionally illustrated in Figure 7.

As indicated, a second frame is provided which is supported by the "I" beam and is vertically adjustable thereon. The second frame consists of a vertically disposed channel member 10, and two horizontal arms 11 and 12. Each arm may consist of two horizontal angle irons rigidly attached in spaced relation to channel member 10, the spaced irons being secured at their opposite ends to brackets 13 and 14 respectively. These two brackets encompass the stationary frame or "I" beam and thereby operate as guides for the second frame in its up and down movement on the "I" beam. An additional bracing means 15 extends between the arms 11 and 12. This bracing means 15 may comprise two vertically extending parallel metal slats, each end of a slat being attached to one of the aforementioned angle irons which are in vertical alignment.

Figure 7:
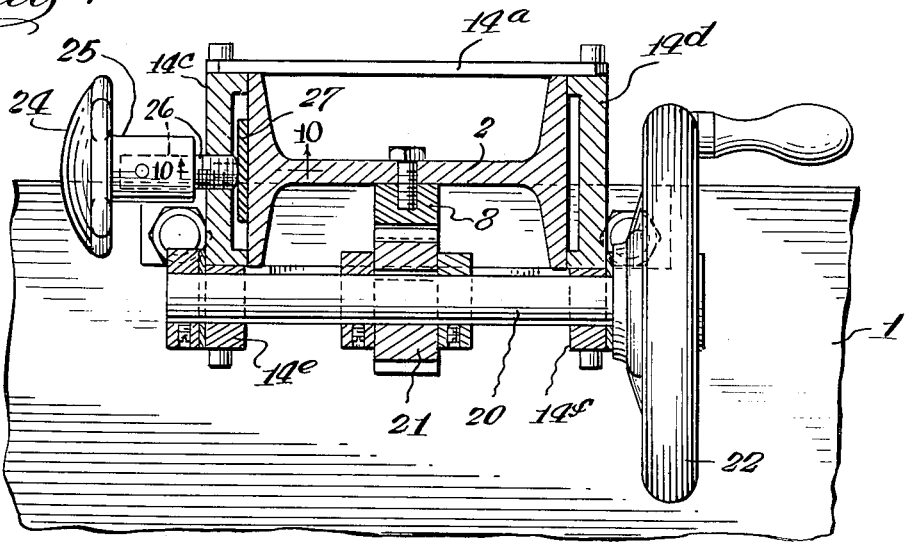
Figure 7 is an enlarged horizontal section corresponding to line 7—7 of Figure 1.
Figure 10:
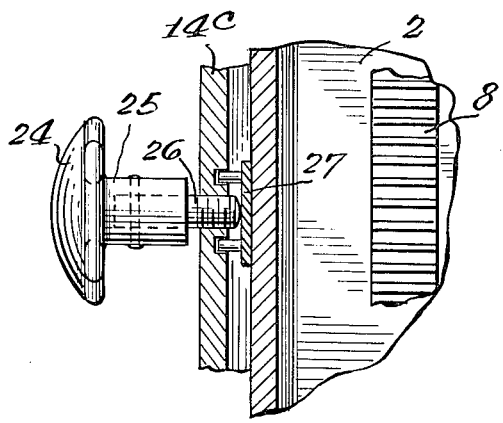
Figure 10 is an enlarged partial section taken on line 10—10 of Figure 1 showing details of the frame locking mechanism.

As best illustrated in Figure 7, there is provided a mechanism for elevating the second frame on the "I" beam and also means for locking the second frame in any desired position on the "I" beam. Lower bracket 14 is adapted to support both the elevating mechanism and the means for locking the two frames in a given position, and accordingly, its construction is somewhat more elaborate than upper bracket 13. Thus, bracket 14 comprises rear cross members 14a, front cross members 14b, and two elongated side panel members 14c and 14d. Additionally, each of the side panels 14c and 14d has a small forwardly projecting member, 14e and 14f respectively, which may, if desired, be formed as an integral part of the side panel. A shaft 20 passes through and is rotatably supported by each of the members 14e and 14f. Fixedly secured to the shaft 20 is a pinion 21, which is engaged with rack 8. Also attached to the shaft 20 is a handwheel 22, provided for the purpose of rotating the shaft and thus the pinion.

A locking knob 24 has associated with it a shank 25 which in turn is secured to a threaded bolt 26, the latter passing through and projecting from side panel 14c. Between the end of bolt 26 and the side of the I beam there is disposed a floating plate 27. Upon turning knob 24 so as to lock bracket 14 and, correspondingly, the second frame to the I beam 2, the end of bolt 26 will force the floating plate 27 against the side of the I beam. A locking arrangement of this type permits the holding power of bolt 26 to be distributed over a wider area, and also prevents forming small pockets or similar imperfections in the side of the I beam by the end of the bolt.

Attached to the top of channel member 10 is a horizontal bracket 30, to which is secured a pulley housing 31. Journaled within housing 31 are two freely rotatable pulleys 32 and 33. A cable 34 is adapted to ride over the pulleys. One end of the cable 34 is tied to a counterbalancing weight 35, enclosed in a protective tube or housing 36, the latter being suspended from bracket 30. The other end of the cable is secured to what, for purposes of convenience, may be termed a magnetic assembly, indicated generally by the letters MA, discussed more in detail hereinafter. The magnetic assembly, which is employed to releasably hold a weight, is carried by the aforementioned second frame, and is vertically adjustable thereon. The weight is preferably a steel ball W weighing for example, two pounds, four pounds, etc.

A rack 37 is secured to the forward face of channel member 10, and is provided with a vertical recess or slot 38 in each of its sides. Recesses 38 are adapted to receive keys associated with horizontally disposed members 39 (see Figure 4) and 40, which are attached to and form a part of the magnetic assembly. By means of this arrangement the magnetic assembly, MA, is guided in its upward and downward movements, and is also retained in juxtaposition with respect to rack 38, for reasons which will become apparent hereinafter.

Secured to the second frame by means of horizontally disposed supports 41 and 42, are a plurality of vertically extending guide rods 43, preferably three in number. These guide rods are positioned so as to form a cage-like enclosure about the path of the ball W in its free descent following release, whereby the ball will be confined if it tends to vary from a substantially straight downward drop. However, under normal operation, the ball will not touch any of the guide rods between the time of its release and the time when it strikes the article under test. In order to enable impact tests to be conducted with heavier weights, and correspondingly with balls of larger diameter, the guide rods 43 are held between supports 41 and 42 in such a manner that they can be adjusted outwardly with respect to the downward path of the ball. This outward adjustment of the guide rods 43 is made possible due to the fact that the rods are eccentrically pivoted to supports 41 and 42. As best illustrated in Figure 8, each guide rod is provided with an eccentrically mounted downwardly projecting pin 44, which is adapted to be received in a circular aperture 45, provided in lower support 41. A similar arrangement is provided with respect to the connection between each guide rod and upper support 42. These eccentrically mounted pins serve as pivots for the guide rods. However, support 41 has, additionally, means for locking each rod in a desired position, the same comprising a set screw 46.

To enable the ball W after release from the magnetic assembly to freely strike an article under test, lower support 41 is provided with a circular opening 47, as illustrated in Figure 6, whose diameter is greater than the diameter of the largest ball which may be employed with the testing apparatus.

Figure 2:
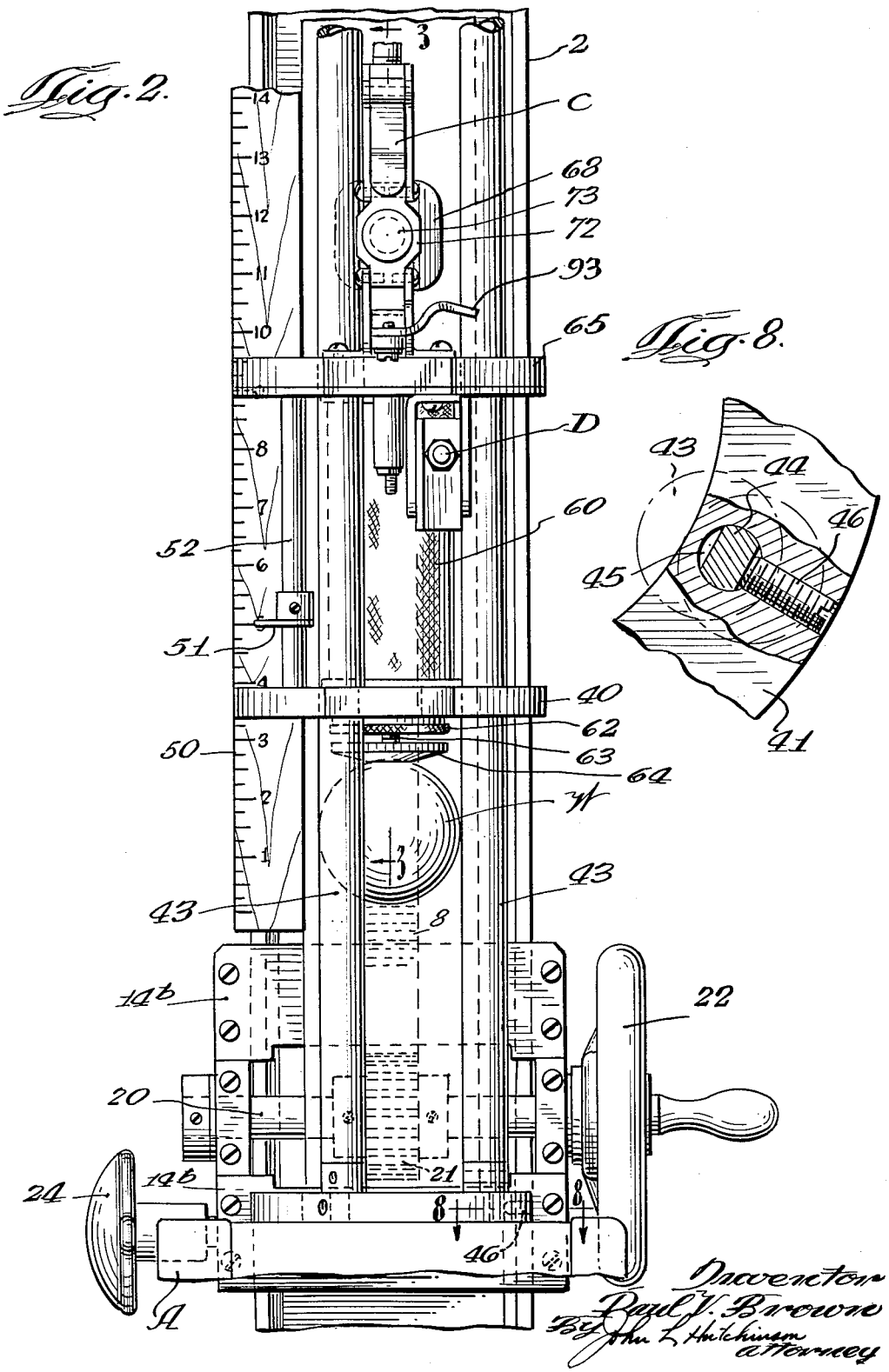
Figure 2 is an enlarged front elevation corresponding to the line 2—2 of Figure 1.

In order that the increments of vertical movement of the magnetic assembly can be accurately determined, and corresponding the various heights from which the ball is released, a scale 50 is attached to the channel member 10 of the second frame. An appropriate pointer 51 is secured to the magnetic assembly in such a position as to enable it to indicate, in association with the scale, a particular height of the ball above an object under test. As shown in Figure 2, the pointer 51 is carried by a vertically extending rod 52, attached to the magnetic assembly, and may be adjusted on the rod in any desired vertical position for purposes of "zeroing" the apparatus.

*Description of the magnetic assembly*

Figure 3:
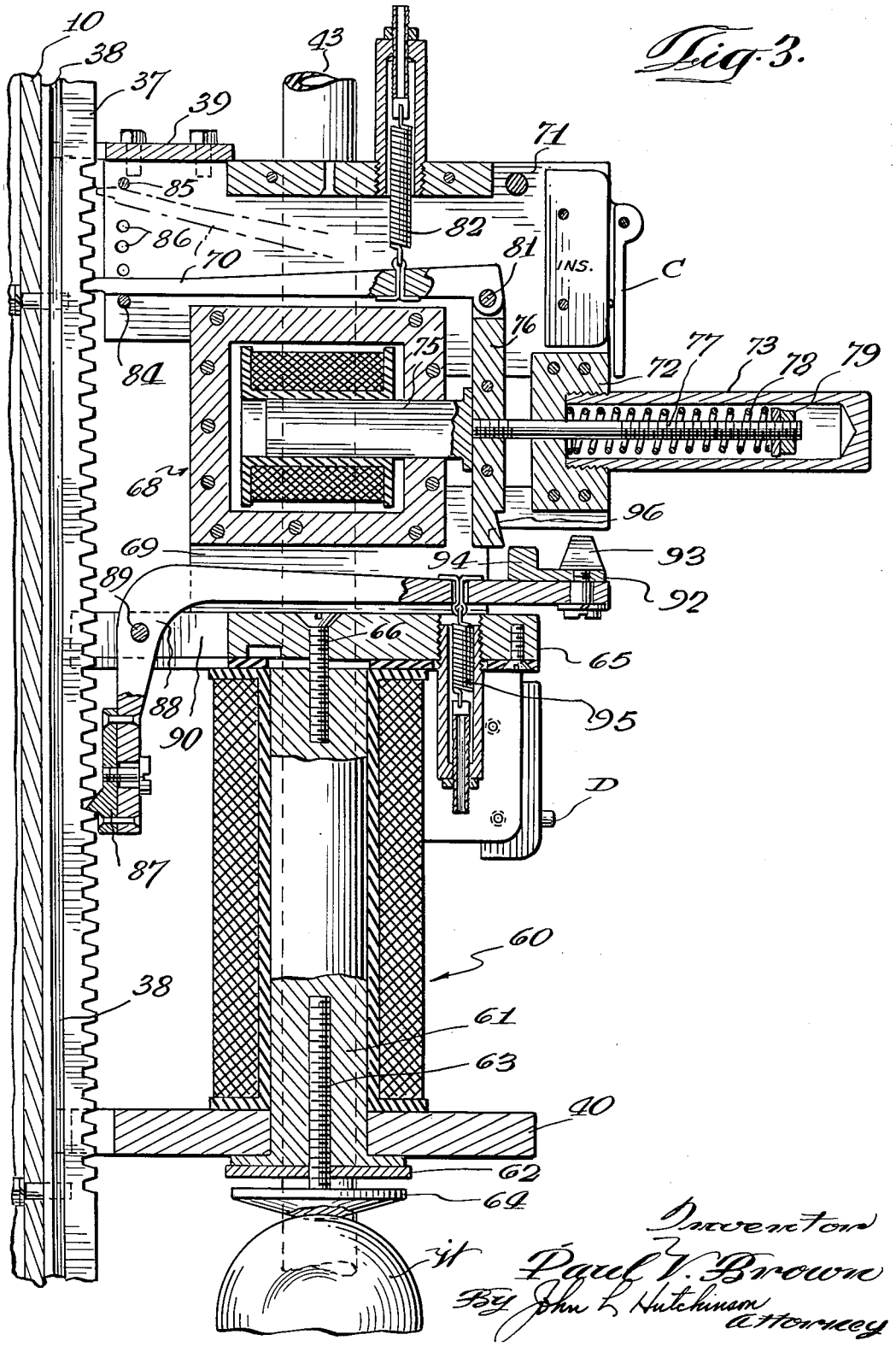
Figure 3 is a vertical section taken on line 3—3 of Figure 2.

As previously indicated, the magnetic assembly is adapted to releasably hold the steel ball W. The ball is held and released by means of a vertically disposed electromagnet 60 provided with a soft iron core 61, as is illustrated in Figure 3. The electromagnet is secured to and supported by the aforementioned horizontally disposed member 40, which is also provided with keys adapted to ride in recesses 38, as previously described. Member 40 is composed of an appropriate non-magnetic material, such as a fibrous laminate impregnated with a resin. Core 61 extends through member 40 to a short distance, as shown.

Secured to the soft iron core 61 by means of a threaded bolt 63 is an anvil 64, which may be adjusted longitudinally with respect to the core. A soft iron locking nut 62 is provided to hold anvil 64 in a given position after adjustment. This anvil and its threaded bolt are also made of soft iron whereby the anvil is magnetized concurrently with the core, and in effect forms an extension of the core. As is shown in Figure 3, the anvil is provided with a slightly concave nose portion for the purpose of conforming to the curvature of the ball W and centering the same. Different anvils with correspondingly different concave nose portions may be employed for different size weights. The purpose of using an extension for the core such as anvil 64 is to nullify or reduce the influence of residual magnetism on the ball W. If ball W were held directly by the core, the residual magnetism remaining in the core after deenergization of its associated windings would tend to retain the ball rather than permit its immediate release. This tendency to retain the ball results in the ball being released off center, whereby it will not fall in a desired downward path. By providing an adjustable extension such as anvil 64, the residual magnetism can be made ineffective to influence the downward path of the ball.

It will be appreciated that the holding power of the residual magnetism existing in the core with respect to the ball will vary with the distance of the ball from the core and the size of the ball. Accordingly, in operation the anvil will usually be adjusted inwardly for larger and heavier balls and correspondingly should be moved outwardly for lighter balls. This adjustment can be accomplished by merely rotating the anvil in the appropriate direction.

Electromagnet 60 has attached at the top thereof a horizontally disposed non-magnetic member 65 which may be secured to the electromagnet by any appropriate means, such as by screws 66. Forming a part of the magnetic assembly is a transversely disposed solenoid 68 which is supported in position by two vertically extending non-magnetic side panels, each of which are attached to member 65. One of these panels is indicated in Figure 3 by the numeral 69. Secured to the upper portion of the solenoid are two additional spaced non-magnetic panels forming a housing for a vertically movable indexing pawl 70, which is engageable with rack 37. One such panel is indicated by the numeral 71. In addition to being connected to the body of the solenoid 68, all of the aforementioned panels are likewise connected to an intermediate block 72, to which is threadably attached a hollow handle 73.

The movable plunger 75 of the solenoid has fixedly secured to its outer end a transverse bar 76. Rigidly attached to bar 76 is a shaft 77 which extends slidably through block 72 and into the cavity of handle 73. Surrounding that portion of the shaft 77 normally within the handle is a compression spring 78. Spring 78 is held in position and under a desired compression by adjusting nut 79. Plunger 75, bar 76, and shaft 77 all move simultaneously as a single unit. Indexing pawl 70 is pivotably attached by pin 81 to bar 76, and may be disengaged from rack 37 when bar 76 is forced to the right by spring 78 when the solenoid is deenergized. Additionally, upon disengagement of the pawl from the rack the pawl is pivoted vertically about pin 81 by spring 82.

Pawl 70 is employed in association with the rack to fix the increments of successive vertical movement of the magnetic assembly. This can be accomplished in conjunction with solenoid 68 by disengaging the pawl from the rack and reengaging it at a predetermined higher point, as indicated by the outlined position of the pawl. The amount of vertical movement of the pawl is determined by the distance between two lugs 84 and 85 extending inwardly from panel 71 and disposed transversely of the vertical path of the pawl. Lower lug 84 is fixedly secured to panel 71 while the position of the upper lug 85 may be varied by inserting it in any one of a plurality of openings 86, which are vertically spaced at predetermined intervals in panel 71, for example, ¼, ½ or 1 inch. Although the lugs 84 and 85 together with openings 86 have proven entirely adequate for controlling the distance of travel of the pawl, other appropriate means may be similarly employed.

When using the type solenoid disclosed in Figure 3, it will be observed that the energization of the solenoid will engage the pawl with the rack, and, correspondingly, deenergization will disengage the pawl from the rack by reason of the action of spring 78. An alternate arrangement can also be employed using a reversably operated solenoid, which in certain respects is preferred, in that the solenoid need not be normally energized. Thus, in an alternate system it is contemplated that the pawl will be disengaged from the rack when the solenoid is energized and, correspondingly forced into engagement with the rack upon deenergization of the solenoid and under the influence of an appropriately disposed reversely acting spring.

To prevent premature downward movement of the magnetic assembly a locking dog 87 is associated with the magnetic assembly and is engageable with rack 37. Locking dog 87 is attached to an L-shaped lever 88 which in turn is pivotably secured, by means of pin 89, to support member 65. Pin 89 is disposed transversely in a recess 90 provided within member 65. Although dog 87 prevents premature downward movement of the magnetic assembly, it will not, in normal operation, interfere with the elevation of the assembly on the frame. This feature is made possible by reason of the construction of the engaging surfaces of the dog. Thus, the under surface of the dog is formed so as to conform to the upper surface of the teeth of rack 37, while the top engaging surface slopes upwardly, permitting the dog to move out of the rack upon elevation of the assembly.

Pivotably fixed to the end of the horizontal arm of the lever 88 is an L-shaped latch provided with a grip 93 and an upstanding lug 94. The L-shaped latch and its associated lug 94 are employed as a safety mechanism when in the normal position shown in Figure 3. Thus, lever 88 is normally held in the position shown by spring 95 such that locking dog 87 is forced into engagement with rack 37. When in this position the lower part of bar 76 may freely move past the top of lug 94 to release pawl 70 from the rack.

When the solenoid 68 is deenergized and the spring has forced the plunger 75, bar 76 and shaft 77 to the right, thereby disengaging the indexing pawl 70 from rack 37, the lower end of bar 76 will be positioned directly above the lug 94 which will prevent lever 88 from rotating on pivot pin 89, thereby preventing disengagement of dog 87 from rack 37. Such an arrangement prevents inadvertent raising of the magnetic assembly when the pawl 70 is disengaged from the rack.

Similarly, if for one reason or another dog 87 should be forced out of engagement with rack 37, lever 88 will pivot about pin 89 and thus cause lug 94 to rise. When so elevated lug 94 will be forced into recess 96 provided in the lower part of bar 76, thereby preventing the latter from moving, and, correspondingly, retaining pawl 70 in engagement with rack 37. When either the pawl or the dog are engaged with the rack as described the magnetic assembly is prevented from moving downwardly. In lieu of spring biasing lever 88, the longer horizontal arm of the lever may be provided with sufficient mass so as to normally force dog 87 into engagement with rack 37 in a like manner to that resulting when using the spring.

If the L-shaped latch is turned outwardly through an angle of 90°, lug 94 will be removed completely from a position wherein it can affect the movement of bar 76. In such a situation both dog 87 and pawl 70 can be disengaged from the rack at the same time, thereby permitting the magnetic assembly to be freely moved up or down to any desired position.

It will be observed, by referring to Figure 5, that horizontal member 65, forming a part of the magnetic assembly, is provided with a plurality of enlarged openings 97 through which are disposed the aforementioned guide rods 43. Thus, the main functional parts of the magnetic assembly are positioned substantially within the area defined by the rods, and the magnetic assembly is adapted to be moved up or down within this area. The guide rods, in addition to serving as confining means for the weight, serve, in either of their alternate positions, as supplements to the keys associated with 39 and 40 to guide the magnetic assembly in its up and down movement, thereby eliminating any sidewise play of the assembly. However, this supplementary guiding action, wherein the rods in either of their alternate positions contact the side of openings such as 97, does not bind or resist the movement of the magnetic assembly.

The two switches C and D are associated with and form a part of the magnetic assembly for controlling the electric circuits. Switch C serves to control the operation of solenoid 68 and thus the engagement of the pawl with the rack independently of the electromagnet, thereby enabling the magnetic assembly to be elevated, while still permitting the electromagnet to retain the ball W. Switch D, however, is provided for the purpose of controlling the operation of both the electromagnet and the solenoid simultaneously, whereby the ball W can be released and, at the same time, the pawl 70 disengaged and reengaged with rack 37 preparatory to moving the magnetic assembly to the next higher level.

It is not essential that these switches be physically associated with the magnetic assembly as shown, rather, if preferred for ease of operation, these switches or duplicate switches can be placed in any appropriate position such as on table 1 or associated with a foot pedal.

Description of the circuit

Figure 9:
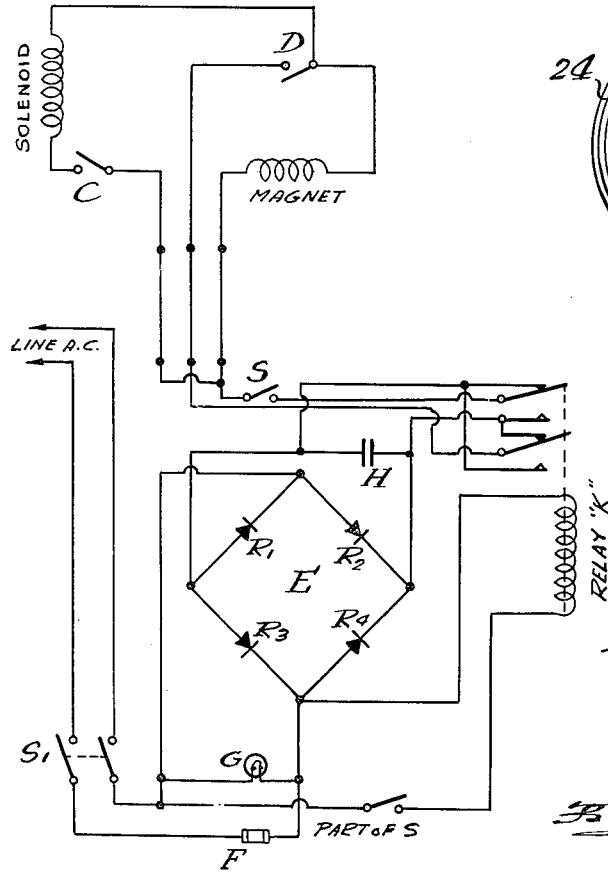
Figure 9 illustrates an electrical circuit arrangement which may be employed with the impact testing machine.

One circuit arrangement which may be employed with the impact tester of this invention is illustrated in Figure 9. As is shown in the drawing, normal A. C. line current is rectified by bridge E whereby the solenoid and the electromagnet are energized by direct current. Pilot light G is connected across the line on the A. C. side of the rectifier and fuse F is provided for emergencies. Switch C is connected within the circuit of, and in series with the solenoid, whereby the latter, as previously described, may be controlled independently of the electromagnet. Switch D is provided for the purpose of simultaneously controlling the operation of the magnet and the solenoid, and, as is shown, is positioned in the common line of the circuits of the solenoid and electromagnet. It is contemplated that in one arrangement both switches C and D will be normally closed, and will be momentarily opened to cause operation of the pertinent components.

Also provided in series within the circuits of the electromagnet is a second double pole switch S which may be used in lieu of switch D for controlling the operation of the electromagnet. As will be observed, switch S is composed of two parts, the second part being connected in series in one side of the A. C. line. Thus, switch S may be employed in the same manner as switch D for controlling the simultaneous operation of the solenoid and the electromagnet.

Switch S is, accordingly, a duplicate of switch D and may be placed in any convenient alternate position, such as on the table 1, as previously indicated, or preferably, established as a foot operation switch. Actually, it has been found that when a switch such as S is in the form of a foot pedal it is more conveniently located for operation, and hence is used more frequently than switch D. Accordingly, a special feature is provided in assoication with switch S which enables the residual magnetism of the metallic parts of the tester to be erased or quenched. This additional feature comprises a ratchet-type relay K which is controlled by the second part of the switch S. Whenever switch S is closed and then opened relay K will be operated, thereby causing the associated contacts of the relay to reverse their position. The reversal of contact positions causes a reversal in the direction of the direct current passing through the solenoid and the electromagnet. Although the current is thus reversed, the operation of the solenoid and the electromagnet is unaffected, however, the new field established upon each reversal is counter to that formed by the residual magnetism, and accordingly serves to nullify or quench the latter.

While there has been described a circuit which includes elements which operate on direct current, it will be readily appreciated that A. C. current may be employed to operate the solenoid, however, only D. C. current should be used for operating the electromagnet.

Operation

In describing the operation of the impact tester, reference will be made to a battery container, however, it will be readily understood that any similar article may be likewise tested for impact resistance.

In determining impact resistance of a battery container the resistance of several sides are tested in order to obtain a complete analysis of the container. Usually such containers are longer in one direction than they are in another. Accordingly, it is necessary initially to adjust the testing apparatus in accordance with the height of the container which is determined by the side being tested in addition to zeroing the magnetic assembly with respect to the second frame.

First, therefore, knob 24 is turned in the direction which will release bracket 14 from the I beam or frame member 2. Handwheel 22 is then rotated a sufficient number of turns until the second frame is elevated on the I beam to a point where a container may be positioned on table 1 immediately below support 41. Elevation of the second frame is accomplished due to the engagement of pinion 21 with rack 81, pinion 21 being secured to a common axle 20 with hand wheel 22.

When numerous containers having the same dimension are to be tested in sequence, appropriate brackets X and Y may be adjusted on the table in accordance with the position of the first container tested, thereby enabling subsequent containers to be more readily positioned.

Following the elevation of the second frame and the positioning of the container as described above, the next step comprises placing the ball W against the anvil 64 of the magnetic assembly. With the magnetic assembly raised so that the indexing pawl 70 is in contact with lower lug 84 movable lug 85 is inserted into any one of the openings 86 of the panel 71 in accordance with the increment of vertical movement desired. As the testing procedure involves releasing the ball W from a predetermined lower height through successively higher elevations, it is necessary that the magnetic assembly be moved downward to its starting position. To accomplish this, the L-shaped latch is turned through an angle of 90°, thereby removing lug 94 from the vicinity of the lower end of bar 76. Handle 73 is grasped far forward to simultaneously apply pressure to switch C. At the same time a finger is extended downward under grip 93 to pull the latter upward. Pressure on switch C deenergizes solenoid 68, thereby causing spring 78 to retract plunger 75, bar 76, and pawl 70, the latter being disengaged from rack 37. Elevation of grip 93 pivots lever 88 about pin 89 and accordingly disengages dog 87 from rack 37. When both the pawl and dog have thus been disengaged from the rack, the magnetic assembly MA may be freely moved up or down on the second frame by means of handle 73. For purposes of initially positioning the magnetic assembly with respect to the second frame, the same is lowered until the bottom of the ball W projects slightly below the bottom of support 41. The L-shaped latch is then returned to its former position by rotating the same 90° backward.

When ball W and the magnetic assembly are in their lowermost position as described, pointer 51 is raised or lowered on rod 52 until it indicates a zero height on scale 50. The pointer when so adjusted may be locked in position by any appropriate means such as a set screw. Following the foregoing initial adjustments, the second frame is lowered by rotating handwheel 22 until the bottom of the ball W just makes contact with the container at the precise point of impact. Knob 24 can then be employed to lock the two frames in the desired position.

As previously indicated, an important feature of this invention is the provision of permitting the magnetic assembly to be raised to successively higher elevations through predetermined and automatically fixed increments. This is accomplished by means of the pawl 70, rack 37, and lugs 84 and 85. Thus, whenever the main operating switch D (or S) is opened solenoid 68 is deenergized, causing pawl 70 to be retracted. As soon as the switch is closed pawl 70 is brought forward and reengaged with rack 37, but at a higher point. This is due to the influence of spring 82 which pulls pawl 70 upward upon disengagement with rack 37. The extent of upward movement of the pawl is determined by the position of lug 85, which can be varied to limit such movement to for example, one fourth inch, one half inch, or a full inch. When pawl 70 is engaged at a higher level, as indicated in outline in Figure 3, the magnetic assembly can be moved upwardly that distance which the pawl has traveled, the upward movement of the magnetic assembly being stopped when pawl 70 strikes against fixed lug 84.

After the foregoing adjustments and positioning have been made the apparatus is ready for use in testing the impact resistance of the container. In practice, the magnetic assembly is usually raised through several inches initially, for the reason that no results are expected when the ball is released from small elevations. For actual testing the ball W is released by momentarily pressing switch D which deenergizes the electromagnet and, in addition, causes pawl 70 to move from a lower position to a predetermined higher position on the rack 37. The result of the ball's impact on the container is observed, and if no crack has occurred, the ball is released from successively higher levels until a crack does occur.

The weight of the ball, plus the height from which it has been released at the time of cracking is a measure of the impact resistance of the container as expressed in inch pounds.

To obtain successively higher levels for releasing the ball, the latter is taken after impact and pushed up against the anvil 64. This pushing action plus the action of the counterweight 35 forces the magnetic assembly through the predetermined increment to the next higher level. In view of the fact that switch D was only operated momentarily, the electromagnet is reenergized and, accordingly, the ball is retained against anvil 64 in position for its next drop.

While there has been shown and described certain exemplary embodiments of the invention, the same is only intended to be limited by the scope of the appended claims.

I claim:

1. In an apparatus for testing the impact resistance of an object by means of a free falling weight comprising in combination a stationary frame; a second frame vertically adjustable on said stationary frame; an electromagnetic assembly supported by and vertically adjustable on said second frame, said electromagnetic assembly being adapted for releasably holding said weight; an indexing element on said second frame; means integral with said electromagnetic assembly releasably engageable with said indexing element, said last named means when engaged with said indexing element being adapted to retain said assembly at the height of engagement, and means integral with said assembly for disengaging said last named means and reengaging the same with said indexing element at a higher predetermined vertical increment, thereby determining the successive increments of vertical movement of the said assembly.

2. In an apparatus as described in claim 1 including means for disengaging said first named means from and reengaging the same with said indexing element simultaneously with the release of said weight.

3. In an apparatus as described in claim 2 including means for varying the increments of vertical movement.

4. In an apparatus as described in claim 2 including means for locking said second frame in a fixed position on said stationary frame.

5. In an apparatus as described in claim 2 including a vertically extending cage-like structure attached to said second frame and disposed about the downward path of said freely falling weight and adapted to confine but normally not contact said weight during its free fall, said cage-like structure comprising a plurality of rod-like members equally spaced about the downward path of said weight.

6. In an apparatus as described in claim 5 wherein said rod-like members are adjustable radially of the path of said weight to enable the use of different sized weights.

7. In an apparatus as described in claim 1 wherein the magnetizable core of the electromagnet assembly is provided with an extendable anvil against which the weight is retained, whereby the effect of residual magnetism in said core on a given weight may be reduced in accordance with the distance of said anvil from said core.

8. In an apparatus for testing the impact resistance of an object with a freely falling weight, the combination of a supporting frame; a separate assembly supported by and vertically adjustable on said frame, said assembly including an electromagnet adapted to releasably hold said weight; and means for limiting the vertical movement of said assembly to successive predetermined increments, said means including a rack on said frame, a retractable pawl on said assembly adapted for engagement with said rack, means for disengaging said pawl from said rack and automatically reengaging it at a higher position on said rack, and means for limiting the distance between engagements of said pawl with said rack and correspondingly the increments of vertical movement of said assembly.

9. In an apparatus as described in claim 8 wherein said second named means includes a solenoid adapted to control the engagement and disengagement of said pawl with said rack, and wherein said pawl is spring biased in a vertical direction.

10. In an apparatus as described in claim 9 wherein said third named means comprises two projections attached to said assembly and extending transversely of the vertical path of said pawl, one of said projections being disposed below said pawl, and the second projection being positioned above said pawl.

11. In an apparatus as described in claim 10, including means for varying the distance between projections and correspondingly the distance between engagements of said pawl with said rack.

12. In an apparatus as described in claim 9 a switch means for controlling the energization of the windings of both the electromagnet and the solenoid whereby the weight may be released and simultaneously the pawl disengaged from and reengaged at the predetermined higher level with said rack.

13. In an apparatus as described in claim 12 a second switch means for controlling the energization of the windings of the solenoid and correspondingly the engagement of the pawl with the rack independently of the operation of the electromagnet, whereby the weight may be magnetically retained by the electromagnet while the assembly is elevated or lowered on the frame.

14. In an apparatus for testing the impact resistance of an object with a freely falling weight the combination of a frame; a separate assembly supported by and vertically adjustable on said frame; an electromagnet forming a part of said assembly and adapted for releasably holding said weight; and means for limiting the vertical movement of said assembly on said frame to successive predetermined increments, said means including a rack on said frame, a solenoid on said assembly, a bar fixedly attached to and extending transversely of the plunger of said solenoid, a pawl pivotally connected to said bar and adapted to engage said rack, means for vertically pivoting said pawl when the latter is disengaged from said rack, means for limiting the pivotal arc of said pawl upon disengagement to permit subsequent reengagement of said pawl with said rack at a predetermined higher level, a spring on said assembly adapted to oppose the travel of the plunger, said solenoid and said spring being jointly operable to control the engagement of the pawl with said rack, the pawl upon disengagement from said rack at a lower level being normally automatically reengageable with said rack at the higher level, and means for limiting the pivotal movement of said pawl with respect to said bar while engaged with said rack upon elevation of said assembly, whereby the distance between the respective engagements of the pawl with said rack determines the successive increments of movement of said assembly.

15. In an apparatus as described in claim 14 wherein the means for limiting the pivotal arc of said pawl upon disengagement with said rack comprises a projecting pin attached to said assembly and disposed transversely of the vertical path of said pawl.

16. In an apparatus as described in claim 15, including means for varying the vertical position of said projecting pin whereby the pivotal arc of said pawl and the increments of movement of said assembly may be correspondingly varied.

17. In an apparatus as described in claim 14 wherein the means for limiting the pivotal movement of said pawl with respect to said bar upon elevation of the assembly comprises a projecting pin attached to said assembly and disposed transversely of the path of and below said pawl.

18. In an apparatus as described in claim 14, including means for simultaneously controlling the operation of the electromagnet and the solenoid.

19. In an apparatus as described in claim 14 including means for controlling the operation of the solenoid independently of the electromagnet.

20. In an apparatus as described in claim 14, including a dog pivotally attached to said assembly and biased in a direction to normally engage said rack, said dog being provided with engaging surfaces which will prevent inadvertent downward movement of said assembly while permitting elevation of the assembly.

21. In an apparatus as described in claim 20, including means for locking said dog into engagement with said rack whenever said pawl is disengaged from the rack.

References Cited in the file of this patent

UNITED STATES PATENTS

| | | |
|---|---|---|
| 1,604,089 | Topfl | Oct. 19, 1926 |
| 1,737,565 | Brenne | Dec. 3, 1929 |
| 2,052,357 | Lukens | Aug. 25, 1936 |
| 2,281,324 | Preston | Apr. 28, 1942 |
| 2,531,388 | Black | Nov. 28, 1950 |
| 2,579,503 | Lubin et al. | Dec. 25, 1951 |

FOREIGN PATENTS

| | | |
|---|---|---|
| 621,804 | Great Britain | Apr. 20, 1949 |